Jan. 29, 1957 P. K. GIRTON 2,779,312
ANIMAL STALL HAVING SWIVEL TYPE ADJUSTABLE V YOKE
Filed May 27, 1954 2 Sheets-Sheet 1
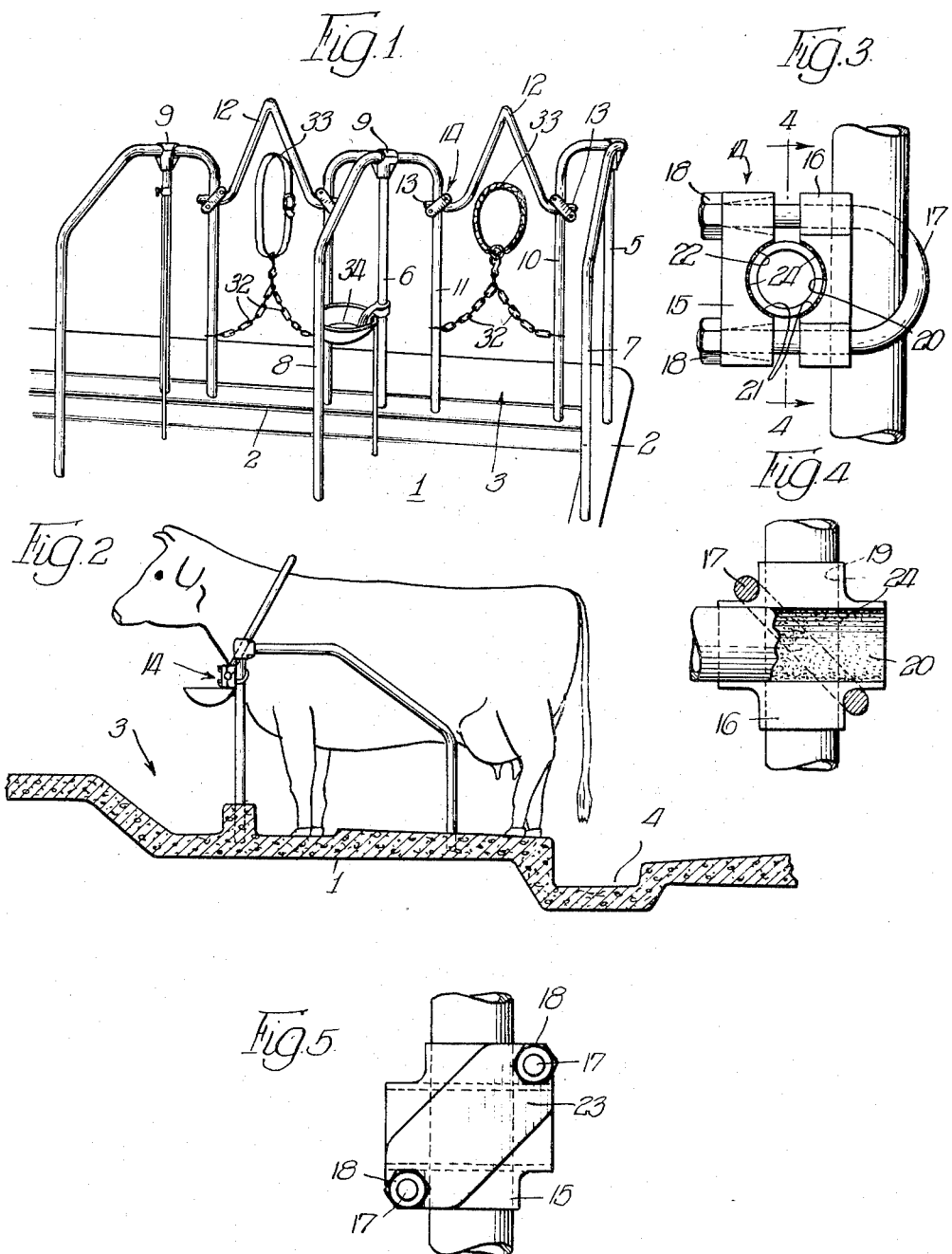
INVENTOR.
Paul K. Girton,
BY
Norman E. H. Heletzke
ATTY.

Jan. 29, 1957  P. K. GIRTON  2,779,312
ANIMAL STALL HAVING SWIVEL TYPE ADJUSTABLE V YOKE
Filed May 27, 1954  2 Sheets-Sheet 2
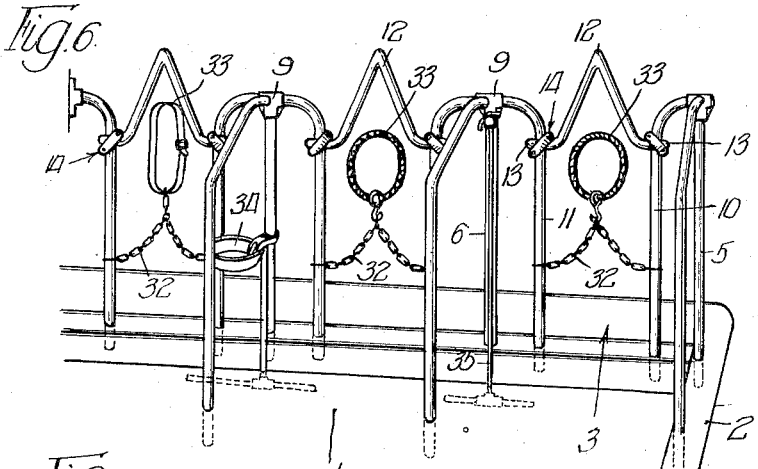
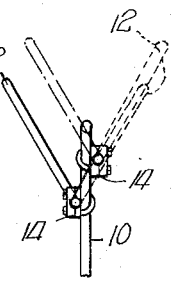
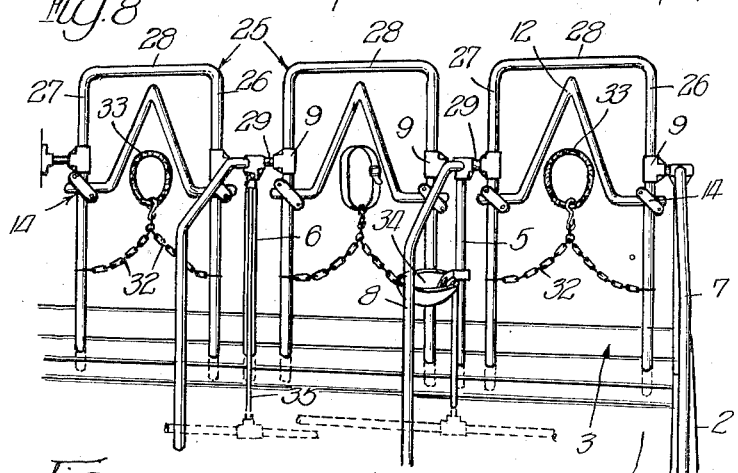
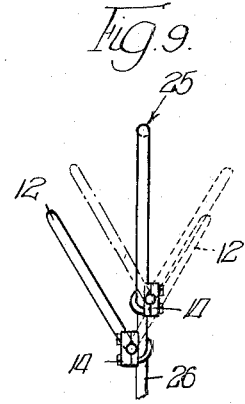
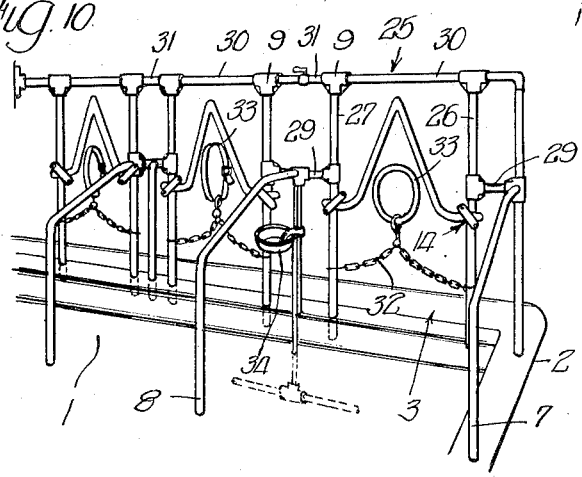
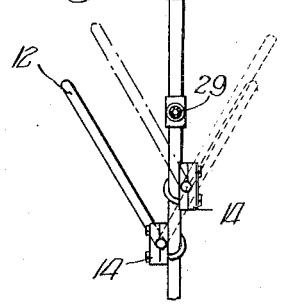
INVENTOR.
Paul K. Girton,
BY
Norman E. H. Lfeletzke
Atty

United States Patent Office 2,779,312
Patented Jan. 29, 1957

2,779,312

ANIMAL STALL HAVING SWIVEL TYPE ADJUSTABLE V YOKE

Paul K. Girton, Millville, Pa.

Application May 27, 1954, Serial No. 432,873

18 Claims. (Cl. 119—147)

This invention pertains to improvements in animal stalls. More particularly stated this invention relates to such devices as cow stalls for dairy barns, milking parlors and the like wherein a restraining yoke is adjustably mounted on the fixed front framework of the stall, whereby to aid in restraining the animal in proper position in the stall.

This invention also relates to improvements in the novel adjustable hinge-like or adjustable swivel type supporting elements for adjustably supporting the animal restraining yoke of the stall in predetermined desired fixed adjusted position.

Devices of the general type contemplated by this invention are most commonly used in dairy barns or milking parlors and the like. Many of such devices are relatively complicated, cumbersome, and costly to manufacture and install, and time consuming to operate. Many of such devices detract unduly from the comfort of the animals, such as cows, restricted in the stalls.

It is common knowledge that cows of different breeds vary appreciably in size. It is also common knowledge that cows of the same breed, but of different ages also vary in size. Such variance in size of the cows in a dairy herd requires the suitable adjustment of the stanchion or restraining element of a stall to permit the comfortable restraining and positioning of the cow in the stall, whereby to aid in the milking and feeding operations and to aid in maintaining proper sanitary conditions around the stall, while at the same time permitting the necessary limited freedom of motion for the comfort of the cow.

To provide a stall including a stanchion or restraining yoke possessing such advantages with respect to the proper restraining of a cow in the stall and at the same time to provide a stall of such construction and operation as to be practical for use in a dairy barn or like structure, it becomes necessary to provide a restraining stanchion or yoke which may be easily and quickly adjusted to accommodate cows of different heights, and which may also be easily and quickly adjusted to accommodate cows of different lengths.

It is therefore a prime object of this invention to provide an improved and novel animal stall, such as a cow stall, equipped with a restraining yoke or stanchion type element; wherein the restraining element is easily adjusted to be properly fitted to cows of different heights and/or different lengths; wherein the stanchion or restraining element and the adjustable supports therefor consist of a minimum of parts and are easy to adjust and operate; wherein the stanchion or restraining element is so constructed and arranged as to comfortably engage the cow in a restraining manner; wherein the stanchion or restraining element may be easily and quickly adjusted as to suitably and comfortably restrain the cow in the stall and at the same time maintain the cow suitably aligned with litter disposal arrangements whereby to facilitate the feeding and milking of the cow and the retention of sanitary conditions in the dairy barn; wherein the stanchion or restraining element imposes the least possible discomfort upon the cow and permits the maximum permissible freedom of movement of the cow while restrained in the stall; and where the improved stall is of relatively simple, and inexpensive construction but which none the less affords the control of the conventional stanchion-type of stall, together with the freedom of movement of the tie-type of stall and the safety of an ordinary stall.

A further objective of this invention is to provide a relatively simple, effective, easily and quickly operable, adjustable support element for adjustably supporting the restraining or stanchion element of the improved cow stall in a fixed adjusted position.

The foregoing and other objectives, important novel features and advantages of this invention, will become more apparent and be more easily understood upon examination of the following description thereof and the accompanying drawings and the appended claims. It should, however, be understood that, without desire of limitation, the preferred embodiment of this invention will be described and illustrated as improvements pertaining to a cow stall. Certain changes and variations may suggest themselves to those skilled in the pertinent arts, which changes may not, however, depart from the spirit of this invention and may come within the scope of the appended claims.

In the accompanying drawings:

Figure 1 is a rear perspective view illustrating a unit of several cow stalls embodying the present invention;

Figure 2 is a side elevational view partially in section, illustrating the variation of the invention shown in Figure 1 of the drawings embodied in a cow stall;

Figure 3 is an enlarged side elevational view of the improved sectional clamp-type adjustable support for supporting the improved yoke in adjusted fixed position on the framework of the stall.

Figure 4 is a view partially in broken away section taken along line 4—4 of Figure 3 of the drawings.

Figure 5 is a left hand end elevational view of the sectional clamp shown in Figure 3 of the drawings;

Figure 6 is a rear perspective view, similar to Figure 1 of the drawings, showing one variation of an embodiment of this invention;

Figure 7 is an elevational view showing the restraining yoke element of Figure 6 of the drawings in different positions of adjustment vertically and angularly;

Figure 8 is a rear perspective view similar to Figures 1 and 6 of the drawings, showing another variation of an embodiment of this invention;

Figure 9 is an elevational view showing the restraining yoke element of Figure 8 of the drawings in different positions of adjustment vertically and angularly;

Figure 10 is a rear perspective view, similar to Figures 1, 6, and 8 of the drawings, showing another variation of an embodiment of this invention;

Figure 11 is an elevational view showing the restraining yoke element of Figure 10 of the drawings in different positions of adjustment vertically and angularly.

Referring generally to the drawings, in which like elements are identified by like numerals, and referring particularly to Figures 1, 2, 6 and 7 of the drawings, 1 represents generally the rearwardly tilted floor panel or base of the improved stall having a transverse curb 2 adjacent its forward end, dividing the platform 1 from the transverse manger portion 3. To the rear of the platform or base 1, that is, to the left thereof, as viewed in Figure 2 of the drawings, a depressed transverse litter trough is designated by the numeral 4. Immediately adjacent to and parallel to the curb 2 of the platform 1 there is provided a shallow transverse depression to accommodate the front hooves of the cows while stationed in the stall.

The improved stall consists of a framework, formed preferably of suitably configured piping, and includes a pair of parallel, vertically disposed or upright front standards or supporting posts 5 and 6 which are positioned in the same plane and which are anchored at their lower ends in or to the curb 2 of the base 1. Rearwardly and downwardly extending parallel and upright panel or partition railing elements 7 and 8 have their respective forward ends secured by pipe clamps 9 to the upper portions of the standards or posts 5 and 6 respectively and have their opposite ends suitably anchored in or to the rearward portion of the floor or platform 1.

The front portion of the improved stall as viewed in Figures 1, 2, 6 and 7 of the drawings, includes two parallel and upright or vertically extending end portions or frontal members or yoke support elements 10 and 11 positioned inwardly of and parallel to the standards 5 and 6. The frontal members or end portions or yoke supporting uprights 10 and 11 are positioned in the same plane with the posts 5 and 6 and are suitably anchored at their lower ends in or to the curb 2. The upper portion of each of the frontal members or yoke supporting uprights 10 and 11 are each curved laterally at its upper end toward the top of the adjacent standards 5 and 6 respectively to which respective standards they are each in turn secured by clamps 9.

A stanchion-like yoke or barrier element 12 having generally the configuration of a V is provided at the ends of its two branch members with axially aligned, laterally extending pintles or support pivot or trunnion elements 13 which lie in the same plane as the branches of the restraining member 12 and one of which extends outwardly from each of the free ends of the branches of the V-shaped yoke 12.

As is clearly illustrated in Figures 1, 2, 6 and 7 of the drawings the V-shaped yoke or stanchion element 12 is supported by the laterally disposed oppositely extending pintles or pivots or trunnions 13 at the ends of the yoke 12. Each of the pivots or trunnions 13 are fitted snugly into and adjustably swiveled in a complementary socket or bearing 21 in an adjustable and sectional pivot gripping clamp type support 14. The clamp type supports 14 are adjustable secured, by frictional engagement, one on each of the frontal members or yoke supporting uprights 10 and 11. Adjustable clamps or sectional supports 14, may, upon the sufficient release of the frictional or gripping engagement between the clamps or sectional supports 14 and the associated pivots or trunnion member 13, be adjusted vertically as well as circumferentially upon the associated frontal member or yoke supporting upright 10 or 11.

The pivots 13 are securely supported or swiveled or hinged and held, in adjustable manner, in the complementary socket 21 of the associated sectional clamping type element or support 14. Clamps 14 are vertically adjusted upon the frontal members 10 and 11 to such a height as to support the V-shaped yoke or barrier element 12 in inverted order, at the desired height from the floor 1 and at a desired angle to the plane of the yoke supporting uprights 10 and 11, thereby to satisfactorily accommodate the animal being restrained in the stall. The sockets 21 of the sectional clamps 14 are axially aligned to rotatably receive the aligned pivot elements 13 in an adjustable, fixable swivel connection.

As is clearly illustrated in Figure 7 of the drawings, the yoke 12 may be angularly rotated or adjusted and then securely clamped or fixed against further swiveling or pivoting so that the plane thereof will be in any desired angular position with respect to the plane of the frontal members 10 and 11 of the stall. To this end it should be observed that the inverted V-shaped yoke 12 extends transversely of the improved stall and spans the distance between the spaced frontal elements 10 and 11 and is slightly narrower than the spacing between the two or pair of the associated frontal members 10 and 11. Such adjustment must obviously be made when the friction between the elements of the sectional support clamps 14 and the pivots 13 has been satisfactorily reduced by loosening the U bolt 17. When the adjustment of the barrier 12 has been satisfactorily made, both as to the height of the barrier 12, by the vertical adjustment of the support clamps 14, and as to the angle of the yoke 12, by the appropriate pivoting of the yoke 12, with respect to the plane of the frontal members 10 and 11 of the stall, then the frictional or gripping engagement between the sectional supporting clamps 14 and the pivots or trunnions 13 of the yoke or barrier 12 as well as the friction engagement between the clamps 14 and the associated frontal support members 10 and 11 is again increased sufficiently, by the tightening of the U bolt 17, to support the yoke 12 in fixed and rigid position in the desired adjusted vertical and angular relationship with respect to the frontal support members 10 and 11.

As is clearly illustrated in Figure 7 of the drawings, the swiveled pivots or trunnions 13 extend laterally slightly beyond the frontal members 10 and 11, to an extent sufficient that the maximum lateral shifting of the barrier yoke 12, which spans the space transversely of the stall intermediate a pair of frontal members 10 and 11, cannot displace the pivots 13 from the sockets 21 in the clamps 14. As will also be noted upon inspection of Figure 7 of the drawings the support clamps 14 may be so mounted on the frontal members 10 and 11 that the respective pivots 13 overlap the members 10 and 11 either forwardly or rearwardly of the members 10 and 11.

Each of the improved adjustable sectional friction type clamps or supports 14, as shown in detail in Figures 3, 4 and 5 of the drawings comprises an outer section 15 and an inner section 16, and a securing member or clamp tightener compression U bolt 17, having the ends thereof threaded to receive the tightening nuts 18. The inner section 16 is generally cross shaped with the vertical element thereof having a vertical concave depression 19 of a curvature complementary to the adjacent convex surface of a frontal element 10 or 11, against which convex surface it is fitted in operation in the manner generally illustrated in Figures 3 and 4 of the drawings. The horizontal branch of the cross-like section 16 is provided with a horizontal concave depression 20 of a curvature complementary to the adjacent convex surface of a pivot element 13 fitted into or adjustably swiveled in the friction or gripping socket 21 of the clamp 14. The friction or gripping socket 21 is formed in clamp 14 by the concave surface 20 and a corresponding or complementary oppositely disposed concave surface 22 in the outer section 15 of support clamp 14.

The outer section 15 is comprised primarily of a horizontal element having a concave horizontal inner surface of a curvature also complementary to the curvature of the outer convex surface of the adjustably swiveled pivot 13, and is of a length comparable to the length of the corresponding horizontal concave depression 20 in the element 16. A compression plate-like portion 23 diagonally traverses the horizontal branch of the element 15 extending from the lower left hand corner to the upper right hand corner of the element 15 as viewed in Figure 5 of the drawings and is apertured at its opposite ends to receive the two ends of the U bolt clamp tightener or securing member 17.

The concave surfaces 20 and 22 are coated with a suitable adhesive coating, such as paint, on to which, when the coating is still wet, there is sprinkled a thin layer of abrasive particles 24, adapted to greatly increase the frictional gripping or clamping action between the surfaces 20 and 22 and a pivot or trunnion element 13 adjustably clamped in the socket 21, whereby to lock or fix the yoke 12 in desired adjusted position upon the tightening of the nuts 18 of U bolt 17.

Such abrasive particles or friction material may if desired consist of size 25G air blast angular grit lightly sprinkled on to the adhesive or wet paint coating of the concave surfaces 20 and 22 of the socket 21. If desired satisfactory frictional engagement between the concave surfaces 20 and 22 of the clamping supports and the surface of the pivots 13 may also be achieved by the suitable selection of materials from which the pivots 13 and the clamp type supports 14 are formed. It must of course be recognized that the friction or clutching type clamp 14 for adjustably supporting the yoke 12 by coaction with the trunnions 13 is susceptible to variations embodying mechanical arrangements well known in the art of clamps and clutching arrangements.

In the assembly of the stall embodying the present invention the clamp 14 is assembled on a frontal element 10 or 11 in the manner illustrated in Figure 3 of the drawings with the elements 15, 16, 17 and 18 in the selective position illustrated in that figure of the drawings. The branches of the bolt 17 extend through diagonally opposite corners of the rear clamp element 16 and through the apertures in the compression plate 23 of the element 15. A pivot 13 of yoke 12 is then inserted into the socket or clamping type bearing or port 21, and the nuts 18 are tightened on the stems of the U bolt 17 so as to engage the compression surface 23 thereby urging the element 15 toward the element 16, to lockingly engage the pivot 13 of yoke 12 and to lockingly engage the concave surface 19 of element 16 against the associated frontal element 10 or 11 upon which the clamp 14 is assembled, thereby simultaneously locking or fixing both the support clamp 14 and the yoke 12 in desired adjusted position with respect to the frontal members 10 and 11.

The clamps 14 supporting the two opposite ends of the yoke 12 are of identical construction and are similarly assembled on the frontal elements 10 and 11 in the manner hereinbefore described, either on the forward side or on the rearward side of the elements 10 and 11 with the sockets 21 in axial alignment. Such arrangement of the clamps 14 enables the vertical and angular adjustment of the yoke 12 to any desired height and angle. The range of adjustment most common in usage is that illustrated in Figure 7 of the drawings, whereby to enable the appropriate restraining engagement of the neck and shoulders of a cow restrained in the stall.

In the hereinbefore described variation of the invention, special reference has been made to the Figures 1, 2, 6 and 7 of the drawings, wherein there is illustrated a variation of the improved stall embodying the present invention and in which the structural parts of the stall are relatively low. Figure 8 of the drawings illustrates a variation of the invention wherein the frontal elements corresponding to elements 10 and 11 of the species of the invention illustrated in Figures 1, 2, 6 and 7 of the drawings, are replaced by a generally inverted U-shaped frame member 25, having downwardly extending parallel, coplanar branches 26 and 27, which are spaced one from another and from the standards 5 and 6 and are positioned in the same plane with the standards 5 and 6 and are anchored to the curb 2, similarly to the arrangement respecting frontal elements 10 and 11 of the first described species of the invention as illustrated in Figures 1, 2, 6 and 7 of the drawings. The base 28 of the inverted U-shaped member 25 has curved ends joining it to the upper extremities of the branches 26 and 27. The element 28 is at a sufficient elevation with respect to the floor 1 and curb 2 as to permit the free and unobstructed pivoting of the associated yoke 12 through the plane of the frontal member 25 when mounted for pivoting by clamps 14 upon the branches 26 and 27 at an elevation normal for adjustment to cows restrained in the improved type of stall. The clamps 14 are secured to the vertical branches 26 and 27 and adjustably support the pivots 13 and yoke 12 in the same manner as described with respect to the species of the invention disclosed in Figures 6 and 7 of the drawings.

As is clearly illustrated in Figure 9 of the drawings the clamps 14 may be so attached to the branches 26 and 27 of frontal member 25 so that the pivot elements 13 of the yoke 12 are positioned either forwardly or rearwardly of the frontal element 25, thereby increasing the range of adjustment of the yoke 12 in the same manner as illustrated in Figure 7 of the drawings.

The frontal member 25 of Figure 8 of the drawings has its vertical branches 26 and 27 secured to the respective adjacent standards 5 and 6 by braces 29 extending horizontally between the clamps 9 at the top of standards 5 and 6 and the adjacent branches 26 and 27 of the frontal member 25. The braces 29 are each secured at one end by a clamp 9 to the top of the associated standards 5 or 6 and are clamped by similar clamps 9 at their opposite ends to the adjacent branches 26 and 27 of frontal element 25.

The variation of the invention disclosed in Figures 10 and 11 of the drawings differs in substance from the variation of the invention illustrated in Figures 8 and 9 of the drawings only in respect of the configuration of the U-shaped member 25 and in respect of the arrangement for securing or bracing the adjacent U-shaped members 25 one to another. As illustrated in Figures 10 and 11 of the drawings the frontal U-shaped member 25 is provided with a straight base portion 30 joined by clamps 9 to the top of the branches 26 and 27 of the frontal member 25. The upper ends of adjacent members 25 of the species illustrated in Figures 10 and 11 of the drawings are joined one to another by the braces 31 which are gripped by the adjacent clamp 9 at the upper ends of branches 26 and 27 of that species of the invention illustrated in Figure 10 of the drawings, thereby to brace the adjacent frontal members 25 one against another. The manner of securing the branches 26 and 27 of the frontal members 25 of Figure 10 of the drawings, to the curb, and to the standards 5 and 6, and the manner of mounting the pivot clamps 14 and yoke 12 upon such branches 26 and 27 is the same as that set forth with respect to the species of the invention illustrated in Figure 8 of the drawings.

As is clearly illustrated in the drawings, the improved stalls are each provided with a tie chain 32 extending between the supports 10 and 11 of Figure 6 of the drawings or the branches 26 and 27 of Figures 8 and 10 of the drawings, to which respective elements the associated chain 32 is slidably secured at its opposite ends. Collars 33 for receiving the necks of the animals to be restrained in the improved stalls are secured to the mid portions of the tie chains 32.

As is also clearly illustrated in the drawings the standards 5 and 6 may if desired be utilized to support such auxiliary devices as water bows 34 and milking machine air lines 35. In the variation of the invention illustrated in Figure 10 of the drawings the axially aligned base elements 30 of the frontal members 25 together with the aligned tie brace portions 31 may, if desired, all be formed as a continuous or suitably joined unit so as to adapt it for use as an air line for milking machines.

From the foregoing description of this invention and from the accompanying drawings it will be apparent that this invention realizes the introductorily enumerated objectives respecting a stanchion or barrier type restraining stall for an animal, which improved stall possesses the hereinbefore listed advantages and provides a new, unique and useful arrangement for the frontal members of a stall and the adjustably pivoted yoke fixedly supported thereon.

Having thus described and illustrated the preferred embodiments of this invention in an improved cow stall, the invention is not to be interpreted as being restricted to the specifically illustrated and described embodiments as set forth in the drawings and as hereinbefore described, except insofar as is necessitated by the disclosure of the prior art and the appended claims.

The invention is hereby claimed as follows:

1. In a stall device of the type described, a pair of laterally spaced partition rails each having a front end and each extending rearwardly and downwardly and anchored to a floor portion of a stall, a separate upright standard for the front end of each rail of said pair of rails, said rails being fixed at their respective front ends to the associated standard and said standards being fixed to said floor, a pair of spaced vertical yoke supporting uprights positioned in a single plane intermediate the pair of said upright standards, each of said spaced vertical yoke supporting uprights being secured to the adjacent one of said pair of upright standards and fixed to said floor, sectional clamping and supporting means adjustably clamped in alignment to said yoke supporting uprights, V-shaped yoke means having opposed ends and having outwardly extending and aligned pintle elements at each of its opposed ends adjustably clamped and releasably fixed in rigid position in said clamping and supporting means, said pintle elements pivotably extending into clamp type sectional bearing ports formed intermediate the adjacent sections of said clamping and supporting means, and clamp securing means clamping said supporting means to said supporting uprights and simultaneously clamping said pintle elements in said sectional bearing ports in rigid releasable fixed position.

2. A cow stall comprising, in combination, a pair of spaced support uprights positioned in a common plane and being adapted to receive the head of a cow therebetween, a restraining element having two opposed ends and having a V shape and being supported in inverted order and extending between said uprights in a single plane, clamp type support means, adjustable securing means for adjustably securing said support means to said uprights for vertical and circumferential adjustment thereon and for tightening said support means, said support means being in alignment on said uprights, and aligned and oppositely extending pivot elements at the two ends of said restraining element and lying in the plane of said restraining element and extending into said support means, said pivot elements being adjustably secured in said support means for adjustable pivoting of said restraining element about the axis of said pivot elements when said securing means is loosened and for releasably fixing said restraining element in predetermined rigid position when said securing means is tightened.

3. An animal stall comprising, in combination, a pair of upright standards defining the corners of one end of the stall and positioned within a single plane, a pair of upright supports intermediate said standards and positioned in the same plane with said standards, yoke support means adjustably secured to said supports for vertical adjustament thereon, said support means including adjustable friction type yoke pivot engaging and supporting and locking means, a yoke means having opposite ends and including at its opposite ends pivot portions engaged and supported in releasable fixed engagement by said friction type yoke engaging and supporting and locking means, adjustable securing means for releasably securing said support means to said upright supports and for simultaneously clamping into locked rigid engagement said friction type yoke engaging means upon said pivot portions of said yoke means, whereby when said securing means is released said yoke means may be adjusted vertically with respect to said upright supports and pivotally adjusted angularly with respect to the plane of said upright supports and whereby when said securing means is locked onto said pivot portions said yoke means comprises a fixed and rigid part of said animal stall.

4. Apparatus of the character described comprising, in combination, two spaced vertical uprights, two vertically adjustable and releasable and securable clamp type support means, securing means for clamping one of said support means to each of said uprights, each of said support means being provided with laterally extending clamping bearing portions, said bearing portions being in alignment, a restraining element having opposite ends and having upper and lower extremities and having laterally extending aligned pivot portions at its opposite ends extending into said clamping bearings, said pivot portions being releasably clamped in fixed position by said support means, whereby said restraining element may be adjusted into any desired angular position about the axis of said pivot elements as well as adjusted vertically upon said uprights when said support means is released and clamped in the desired fixed position of vertical and angular adjustment when said support means is secured.

5. A device according to claim 4, wherein said securing means is adapted to simultaneously secure said support means to said uprights and releasably clamp said pivot elements in fixed position said clamping bearings of said support means.

6. A stanchion comprising, in combination, vertical and coplanar spaced front support posts, a restraining member extending in releasable fixed and rigid position between said support posts and having opposed ends and having a yoke-like portion intermediate its ends, said restraining member being adjustably supported in rigid fixed position on said posts, and lockable and adjustable support means rigidly and releasably supporting said restraining member in fixed position upon said post, said support means being so constructed and arranged whereby said restraining member may be vertically adjusted with respect to said posts and may be angularly adjusted with respect to the plane of said posts when said support means is unlocked.

7. A milking parlor stall for restraining a cow stationed therein, comprising, in combination, stall end portions spaced one from another a distance narrower than the normal width of a cow, two side partition portions connected respectively to said end portions to form a stall, an inverted V-shaped restraining barrier member spanning the space between said stall end portions and having opposed ends and having said ends swiveled adjustably to said stall end portions for engagement with the neck and shoulders of a cow restrained in the stall, and releasable clamp type swivel support elements secured to said end portions and to said barrier and receiving said opposed ends of said barrier member for adjustably clamping the adjacent ends of said barrier member in fixed rigid position and fixedly supporting said barrier in any desired position of swiveling.

8. In combination, spaced support elements adapted to receive the neck and shoulders of an animal therebetween, an inverted and generally V-shaped barrier member having opposite lower ends and extending intermediate said support elements and adjustably secured at each of its opposite lower ends to the adjacent one of said support elements, and adjustable and fixable clamp type securing means receiving the opposite ends of said barrier member and releasably secured to said support elements and releasably locking and supporting said barrier member vertically and angularly in predetermined fixed position with respect to said support elements.

9. A device of the type described, comprising, in combination, two spaced supports, restraining means extending transversely of and spaced intermediate said supports and spanning the space therebetween, and adjustable clamp type support means releasably and rotatably supporting said restraining means in fixed position upon said spaced supports at a predetermined vertical position and in any predetermined desired angle to a vertical plane passing through the axis of rotatability of said restraining means.

10. A device of the type described, comprising, in combination, a pair of vertically disposed and parallel support elements secured to a base and positioned in a single plane, a barrier element having opposed ends and including outwardly disposed pivot portions at the opposite ends of said barrier element, said barrier element extending intermediate said supports transversely thereof, and adjustable clamping type support means adjustably secured to and supported in desired position on said parallel support elements, said support means adjustably receiving and clamping said pivot portions of said barrier element and supporting and locking said barrier element in desired predetermined adjusted fixed position with respect to the plane of said support elements.

11. A device according to claim 10, wherein each of said support means includes a contractable and sectional socket portion for receiving the pivot portion of the adjacent end of said barrier element.

12. A device according to claim 11, wherein the sections of the support means defining said socket portion are of such proportion and arrangement and construction whereby to adapt associated sections to be tightly clamped against a pivot portion extending into the socket portion from said barrier element to lock said pivot portion in fixed position.

13. A device according to claim 12, wherein tightenable clamping means are adapted when tightened to clamp said support means to the associated support element and simultaneously clamp the associated sections of said support means against said pivot portion extending into the socket portion of the complementary support means.

14. A device according to claim 13, wherein said adjustable support means are vertically and circumferentially adjustable upon said support elements and wherein the socket portions of said support means are axially aligned.

15. A device according to claim 14, wherein said barrier element is adjustably rotatable about the axis of said pivot portions and fixable in any desired angle of rotation, whereby to fixedly dispose and lock said barrier element at any desired adjusted angle with respect to the plane of said parallel support elements.

16. A device according to claim 15, wherein said barrier element is of an inverted V-shaped configuration.

17. A device according to claim 16, wherein the outer diameter of each of said pivot portions is substantially exactly equal to the inner diameter of the associated socket portion formed by the complementary sections of the associated support means when said complementary sections are compressed together to reduce the diameter of the respective socket portions to grip the pivot portions and lock the pivot portions and the barrier element in fixed rigid position.

18. A device according to claim 17, wherein the inner surfaces of said socket portions, which surfaces engage said pivot portions of said barrier element are coated with abrasive particles, whereby to increase the friction and gripping action with which the complementary surfaces of said socket portions and said pivot portions are engaged when said clamping means is tightened.

References Cited in the file of this patent

UNITED STATES PATENTS

| | | |
|---|---|---|
| 1,692,470 | Sederberg | Nov. 20, 1928 |
| 2,294,781 | Ingraham | Sept. 1, 1942 |
| 2,557,688 | Reifsnyder | June 19, 1951 |
| 2,578,093 | Schillinger | Dec. 11, 1951 |
| 2,648,308 | Ogden | Aug. 11, 1953 |

FOREIGN PATENTS

| | | |
|---|---|---|
| 111,296 | Sweden | May 25, 1944 |
| 137,331 | Sweden | July 3, 1952 |
| 138,757 | Sweden | Oct. 23, 1952 |